Dec. 7, 1943.    J. P. CLIFFORD    2,336,347
AUTOMATIC WEIGHING MACHINE
Filed May 31, 1940    5 Sheets-Sheet 1

Fig. 1.

Inventor
JOHN P. CLIFFORD
By Morris & Bateman
Attorneys

Dec. 7, 1943.  J. P. CLIFFORD  2,336,347
AUTOMATIC WEIGHING MACHINE
Filed May 31, 1940  5 Sheets-Sheet 2

Inventor
JOHN P. CLIFFORD
By
Attorneys

Dec. 7, 1943.   J. P. CLIFFORD   2,336,347
AUTOMATIC WEIGHING MACHINE
Filed May 31, 1940   5 Sheets-Sheet 3
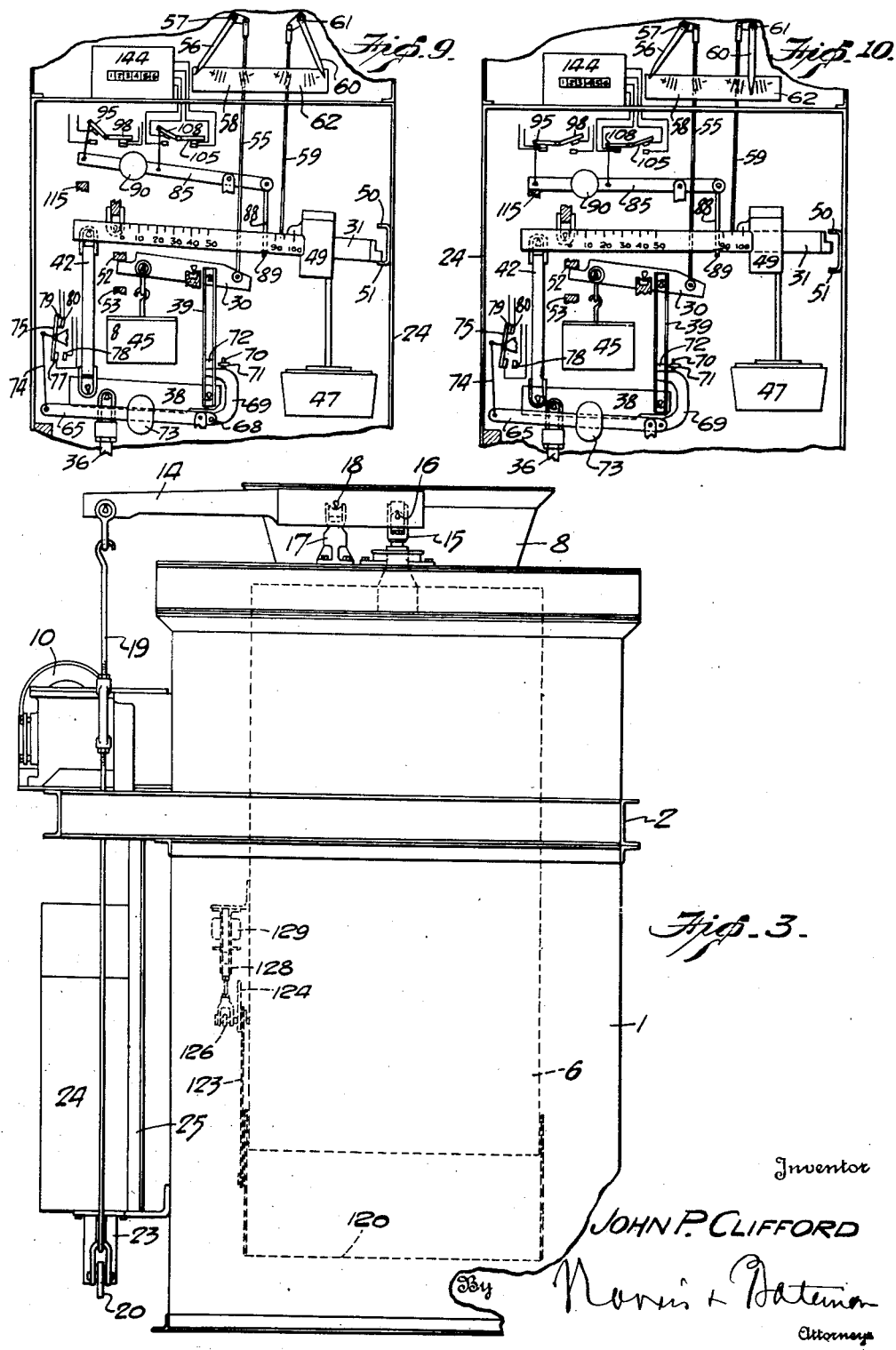
Inventor
JOHN P. CLIFFORD
By Morris & Bateman
Attorneys

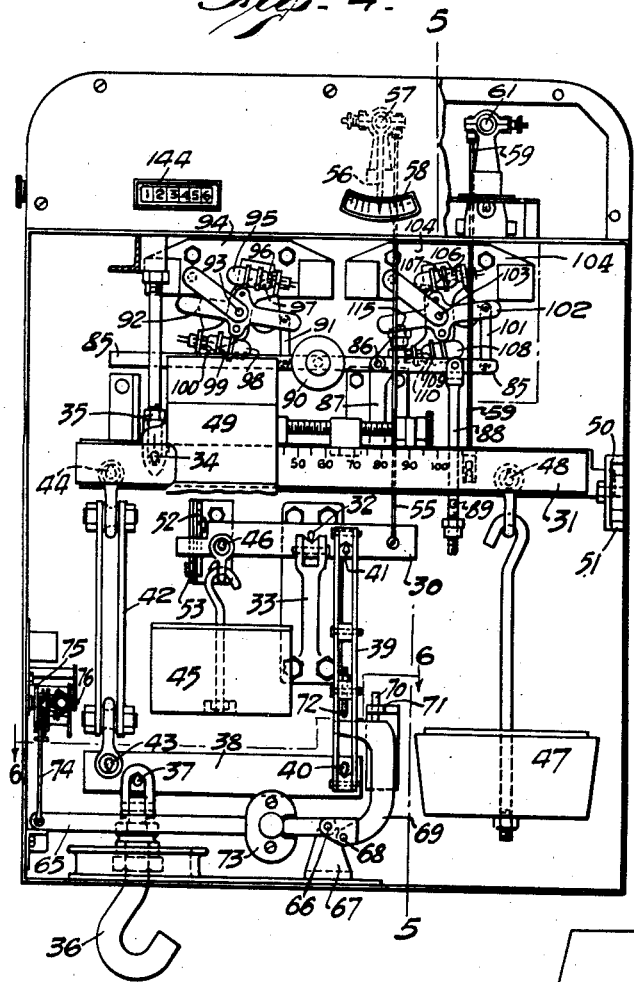
Dec. 7, 1943.　　　J. P. CLIFFORD　　　2,336,347
AUTOMATIC WEIGHING MACHINE
Filed May 31, 1940　　　5 Sheets-Sheet 4
Inventor
JOHN P. CLIFFORD Dec. 7, 1943.   J. P. CLIFFORD   2,336,347
AUTOMATIC WEIGHING MACHINE
Filed May 31, 1940   5 Sheets-Sheet 5

Inventor
JOHN P. CLIFFORD
By
Attorneys

Patented Dec. 7, 1943

2,336,347

UNITED STATES PATENT OFFICE 2,336,347

AUTOMATIC WEIGHING MACHINE

John P. Clifford, Passaic, N. J., assignor to Richardson Scale Company, Clifton, N. J., a corporation of New Jersey Application May 31, 1940, Serial No. 338,267

17 Claims. (Cl. 249—45)

The present invention relates to weighing machines, and more especially to those of the automatic type embodying means governed by the weighing mechanism for controlling the feed of material to a weigh hopper or other suitable weighing receptacle to make up predetermined weighed loads therein, and for controlling the discharge of the weighed loads. The invention is applicable to machines for weighing coal, grain, flour, ore, rock products or other fluent materials of various kinds.

Heretofore, weighing machines have been either of a type employing a leverage system embodying a weighted beam which is brought to a true balance to correctly weigh a load, and must be brought to a stop, up or down, if out of balance, or of a type employing a dial scale and a pendulum or spring action which is in equilibrium with the load at all times within its capacity, without resting on a stop at any time. For the automatic control of the materials being weighed, the balanced beam system possesses the advantage of the consistent action of a free beam at the time it reaches a condition of equilibrium with the load, but its disadvantage is its inability to indicate the condition of a weighing operation except at the end of the cycle or when a balance is reached; and the advantage of the dial and pendulum or spring type is its ability to indicate the condition of the weighing operation at any time during the cycle, but it has the disadvantage of inconsistency of the beam action caused by the pendulum or spring, which is detrimental to the automatic control of the weighing operation.

The primary object of the present invention is to provide an improved automatic weighing mechanism which possesses the advantages of both of those systems but overcomes the disadvantages thereof. To accomplish these results, the present invention provides a duplex beam system in which one of the beams, which is separate and distinct from the other beam which performs the weighing operation, indicates automatically at every cycle an empty condition of the weigh hopper and controls the initiation of the feeding of material, and the other beam, which controls the weighing operation and indicates completion thereof, does not move until the full weighing for which it is set is made and a balanced condition obtains.

Another object of the invention is to provide novel and improved means, governed by such a beam system for automatically controlling the feeding of the material being weighed and the discharging of the weighed loads whereby these operations are controlled without influencing the free balancing of the beams when the weigh hopper is empty and when it contains a full weighing, thereby insuring accuracy in the weighing operations.

Further objects of the present invention are to provide means for checking and indicating the tare load balance by the duplex beam system, to provide novel and improved means to compensate for the weight of the column of material falling into the weigh hopper at the moment the feed of material thereto is cut off, to provide a novel and improved interlock to prevent feeding of material into the weigh hopper unless the discharge door thereof is closed, and to provide a generally improved control system for the various elements of the weighing mechanism whereby improved and more reliable operation is attained.

To these and other ends, the invention consists in certain improvements and combinations and arrangements of parts all as will be hereinafter more fully described, the features of novelty being pointed out more particularly in the claims at the end of this specification.

In the accompanying drawings:

Fig. 1 is an elevation, partly broken away, of an automatic weighing machine constructed in accordance with the present invention;

Fig. 3 is an end elevation of the machine as viewed from the right in Fig. 1;

Fig. 4 is an elevation on an enlarged scale, showing the preferred details of construction of the system of weighing levers and the automatic means governed thereby for controlling the weighing operations;

Fig. 5 is a vertical section taken on the line 5—5 in Fig. 4;

Fig. 6 is a horizontal section taken on the line 6—6 in Fig. 4;

Figs. 7, 8, 9 and 10 are diagrammatic views, illustrating the cycle of operation of the weighing mechanism;

Fig. 12 is a detail view of one of the controlling switches.

Similar parts are designated by the same reference characters in the different figures.

Figure 7:
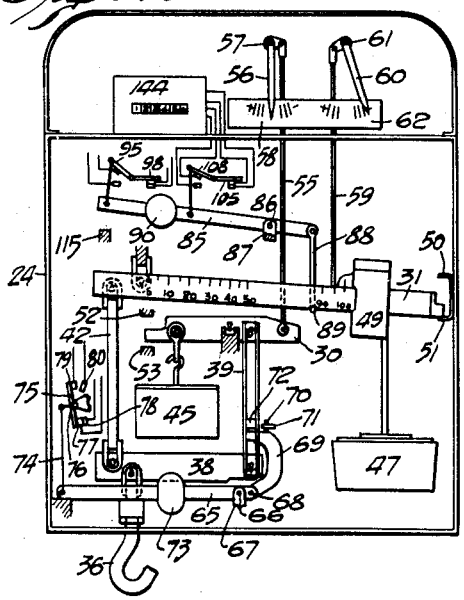

The preferred embodiment of a weighing machine adapted for the feeding and weighing of coal, grain, flour, ore, rock products and similar fluent materials is disclosed in the drawings and will be hereinafter described in detail. It is to be understood however that the invention is not restricted to the precise construction shown since the invention may be adapted to the feeding and weighing of other materials, and constructions equivalent to that shown are contemplated and such will be included within the scope of the claims.

As shown in the present instance, the machine comprises generally a casing 1 of sheet metal or the like provided with a frame 2 of channel iron or other suitable structure for supporting it, a chute 3 through which the material to be weighed is fed to the machine from a bin or other suitable source of supply, the chute being connected to the top of the casing preferably by a flexible dust-proof sleeve 4, a feeder 5, and a weigh hopper or other suitable weighing container 6 into which the material is fed and in which it is weighed, the side of the weigh hopper adjacent to the discharge end of the feeder 5 being partially cut away and the feeder projecting partially into the weigh hopper, as indicated in Fig. 1.

Feeders of different kinds may be employed to suit the character of the material to be weighed, the feeder shown in the present instance comprising an endless belt which passes over a pulley 7 beneath a hopper 8 below the chute 3 to receive material and over a pulley 9 at one side of the weigh hopper 6 to deliver the material thereto. The belt of the feeder is driven in a direction to carry its upper side from the hopper 8 toward the weigh hopper preferably by an electric motor 10 through an interposed reduction gearing 11 of any suitable or well known type, the reduction gearing being connected by a chain or belt 12 to a pulley or sprocket 13 on the shaft of the belt pulley 9. The motor and reduction gearing may be conveniently mounted on the frame 2.

The weigh hopper 6 is suspended in the casing from a weighing lever 14 by a pair of shackles 15 which hang from knife edges 16 on the lever 14, and the latter is fulcrumed on the casing by a pair of brackets 17 on which rest knife edges 18 on the lever 14. The end of the lever 14 opposite to that from which the weigh hopper is suspended is connected by a rod 19 to a lever 20 which is fulcrumed by its knife edges 21 on bearings 22 supported by a bracket 23 which is fixed to the underside of a beam box 24, the latter being fixed, as by frame members 25, to the front of the casing 1.

The beam box contains the system of weigh beams and mechanism governed thereby for automatically controlling the weighing operations. The beam mechanism in the beam box comprises a pair of weigh beams 30 and 31. The beam 30 is pivotally supported by knife edges 32 on a bearing bracket 33 fixed to a wall of the beam box, and the beam 31 is pivotally supported by knife edges 34 upon a bearing bracket 35 fixed to a wall of the beam box. The reaction to the load or weight of the weigh hopper 6 and its contents is balanced by the pull of the lever 20 on a hook 36 which is movable freely through the bottom of the beam box, and the load or the pull of the hook 36 is split or divided between the beams 30 and 31, the hook being pivotally connected to knife edges 37 which are located between the ends of a freely floating lever 38 one end of which is connected by a shackle 39 to the weigh beam 30 by knife edges 40 and 41 and the other end of which is connected by a shackle 42 to the weigh beam 31 through knife edges 43 and 44. A proportion of the load transmitted from the weigh hopper to the beam 30 is balanced by a scale pan 45 which is suspended by knife edges 46 from this beam, the beam 30 with its balancing pan 45 balancing the weigh hopper 6 or the tare load. The remaining portion of the load transmitted from the weigh hopper is balanced by the beam 31 and its balance pan 47 which is suspended from this beam by knife edges 48, and by a sliding poise 49. The beam 30 with its balance pan 45 thus balances the weigh hopper 6 or the tare load, and the beam 31 with its balance pan 47 and poise 49 balances the tare load plus the net load in the container or the gross load upon the scale system. The sliding poise 49 is adjustable on the beam 31 according to the net weight of the material which is to be weighed in the weigh hopper, and when this poise is in its zero position as shown in Fig. 4, the balance pan 47 of the beam 31 balances the proportion of the tare load of the weigh hopper which is sustained by the beam 31. The beam 31 is freely oscillatable between upper and lower relatively fixed stops 50 and 51, it occupying a position between these stops when in balance. The beam 30 is oscillatable between upper and lower stops 52 and 53, it occupying a position between these stops when the weigh hopper is empty, the balance pan 45 on this beam then balancing the empty weigh hopper, and when a predetermined proportion of the total load to be weighed has been introduced into the weigh hopper, the beam 30 will bear against the upper relatively fixed stop 52.

The beam 30 is operatively connected, as by a rod 55, to an indicator 56 which is pivoted at 57 on a part of the casing and cooperates with a suitable scale 58 thereon, this indicator occupying a central position on its scale when the beam 30 is in balanced position. The beam 31 is operatively connected, as by a rod 59, to an indicator 60 which is pivoted at 61 on the casing and cooperates with a scale 62 thereon, this indicator occupying a central position on its scale when the beam 31 is in balanced position. If the indicator for either beam occupies a position at either side of its central position on the respective scale when the weigh hopper is empty and the poise 49 on the beam 31 is in its zero position, this will indicate that the scale system is out of equilibrium with the weigh hopper, and appropriate correction can be made to bring the beam system into equilibrium with the weigh hopper. Since the beam 30 will assume its balanced position when the weigh hopper is empty, the indicator 56 connected to this beam will assume its middle position on its scale and thus indicate the empty or tare balance condition of the scale system automatically at the empty or discharge point of the complete cycle of operations, and since the indicator 60 connected to the beam 31 will assume its central position on its scale when this beam assumes a balanced position when the net load of material fed into the weigh hopper is in equilibrium with this beam according to the setting of the poise 49 thereon, this indicator will indicate the balanced condition of the scale system automatically at the full or loaded point of the cycle of the weighing operation.

The weigh beams 30 and 31 govern automatically the feeding of the material to and discharging thereof from the weigh hopper. Preferably and as shown in the present instance, the material is fed into the weigh hopper first rapidly or with a full feed, and when the major portion of the load to be weighed has been fed into the weigh hopper, the feed of the material is reduced to a dribble flow or feed which continues until the full load for which the weighing mechanism is set has been fed into the weigh hopper, whereupon the weighed load of material is discharged therefrom. The present invention also provides preferably means to compensate for the material falling from the feeder into the weigh hopper at the moment the feed of material thereto is cut off, so that the material thus falling will make up the full and correctly weighed load in the weigh hopper.

Figure 8:
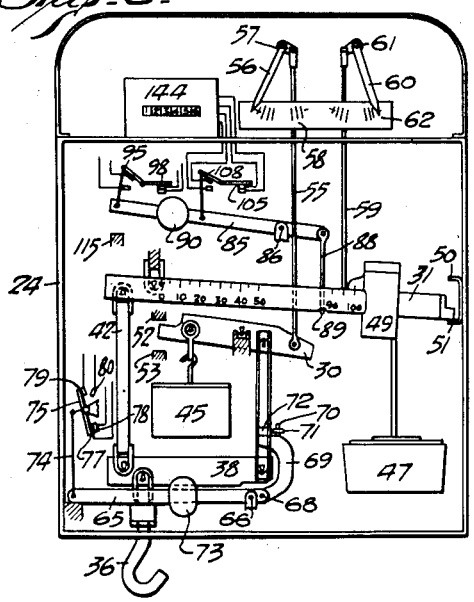
Figure 2:
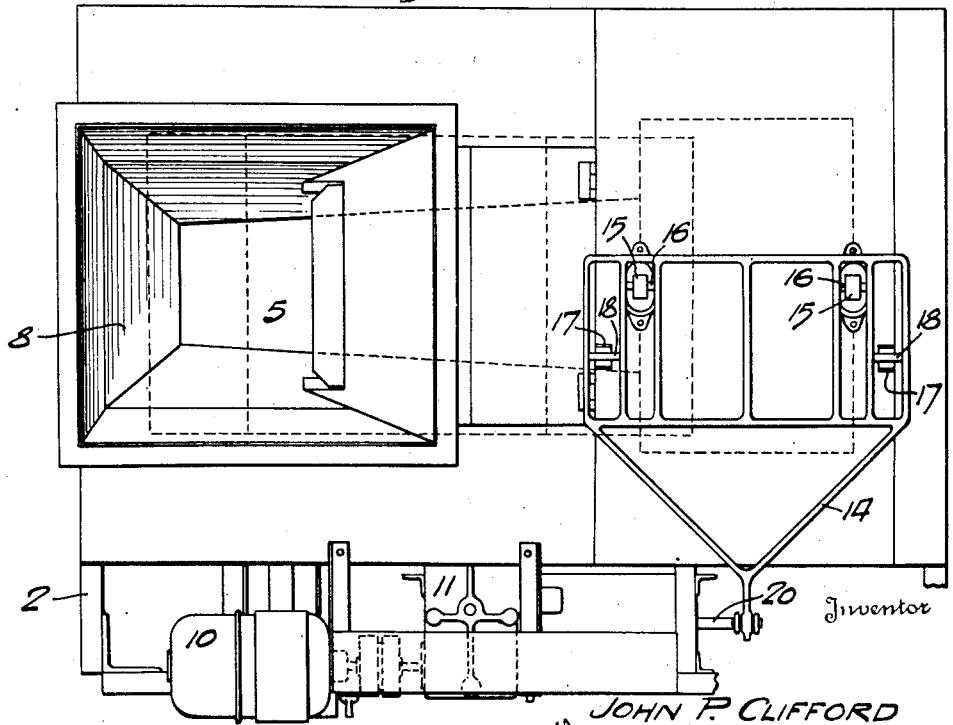
Fig. 2 is a top plan view of the machine shown in Fig. 1.

Accordingly, a lever 65 is pivoted at 66 on a suitable bracket 67 secured in fixed position within the beam box, one end of this lever being pivotally connected at 68 to a link 69 which is guided for vertical movement by a pin 70 thereon which slidably engages a guide 71 fixed to a wall of the beam box, the upper end of the link 69 underlying an abutment 72 carried by the shackle 33 connected to the beam 30. While the beam 30 is in balanced position, the abutment 72 is above the upper end of the link 69 but when the weighted end of the beam is lifted toward its upper stop 52, under the influence of the weight of material fed into the weigh hopper, the abutment 72 will descend upon the link 69. The lever 65 has a weight 73 thereon which is adjustable to different points along this lever according to the proportion of the load of material to be fed into the weigh hopper with a full flow or feed, and when this proportion of the load of material has been fed into the weigh hopper, the abutment 72 bears on the link 69 with sufficient pressure to lift the lever 65 and its weight 73. The lever 65 is operatively connected by a rod or link 74 to a switch operating member 75 which is pivoted to rock on a relatively fixed pivot 76 supported in the beam box, this member carrying a pair of mercury switches one of which has a pair of contacts 77 and 78 which are closed when the lever 65 is in its lower position, as shown in Figs. 7 and 8, and the other has a pair of contacts 79 and 80 which are closed when the lever 65 is lifted, as shown in Figs. 9 and 10.

The weigh beam 31 cooperates with a compensating lever 85 which is pivoted at 86 on a bracket 87 suitably fixed in the beam box, one end of this lever having a link 88 pivotally connected thereto, the lower end 89 of this link being arranged to bear against the underside of the beam 31 and the other end of the lever 85 carrying a compensating weight 90 which is adjustable along the length of this lever so that it may be set to compensate for the weight of the material falling into the weigh hopper from the feeder at the moment the feeder is stopped or the feed is interrupted. The weighted end of the compensating lever is operatively connected, as by a link 91, to a rocker 92 which is pivotally supported at 93 on a bracket 94 which is secured in fixed position in the beam box, this rocker carrying a suitable switch such as a mercury switch 95 the terminals 96 and 97 of which will be in open condition when the weighted end of the lever 85 is lifted, and this rocker also carries a switch, such as a mercury switch 98 the terminals 99 and 100 of which will be in closed condition when the weighted end of the lever 85 is lifted. The compensating lever 85 is also operatively connected as by a link 101, to a rocker 102 which is pivotally mounted to rock on a pivot 103 which is supported in fixed position by a suitable bracket 104 fixed in the beam box, this rocker carrying a switch, such as a mercury switch 105 the terminals 106 and 107 of which are in closed condition when the weighted end of the lever 85 is lifted, and this rocker carries a switch such as a mercury switch 108 the terminals 109 and 110 of which are in open condition when the weighted end of the lever 85 is lifted. When the weighted end of the lever 85 is lowered, the terminals of the switches 95 and 108 are in closed condition and the terminals of the switches 98 and 105 will be in open condition. The descent of the weighted end of the compensating lever 85 is limited by a stop 115 which may be carried on the relatively fixed supporting bracket 87 for the compensating lever. This stop is so located or adjusted that the abutment 89 on the lower end of the link 88 will be held out of engagement with the underside of the beam 31 as the latter approaches its balanced position between the stops 50 and 51.

The weigh hopper 6 is provided with a door 120 which controls the discharge of the weighed load of material therefrom. Preferably and as shown, this door is pivoted at 121 to the lower end of the weigh hopper so that it may swing in a vertical plane to and from closing relation with the open bottom of the weigh hopper, and the door is counterweighted by a weight 122 which overbalances the weight of the door and acts to automatically close the door after a load of material has been discharged from the weigh hopper. The door is locked in its closed position by a toggle comprising a pair of pivotally connected links 123 and 124, the lower end of the link 123 being pivotally connected at 123ª to the hopper door 120, and the link 124 being pivotally connected to the adjacent side of the hopper by a pivot pin 125 to one end of which a lever 126 is also pivoted, this lever being provided with a stop 127 against which the toggle link 124 rests while in locked position. The lever 126 is operatively connected at its free end to the core 128 of a solenoid 129 mounted on the weigh hopper. The link 124 operates or carries a switch, preferably a mercury switch 130 which will be in a closed circuit condition when the weigh hopper door is closed and locked by its toggle, at which time the toggle link 124 will rest on the stop 127, and will be in open circuit condition while the weigh hopper door is open, as shown in Figs. 1 and 11, this switch rocking with the toggle member 124 during the closing and opening movements of the hopper door 120.

Figure 11:
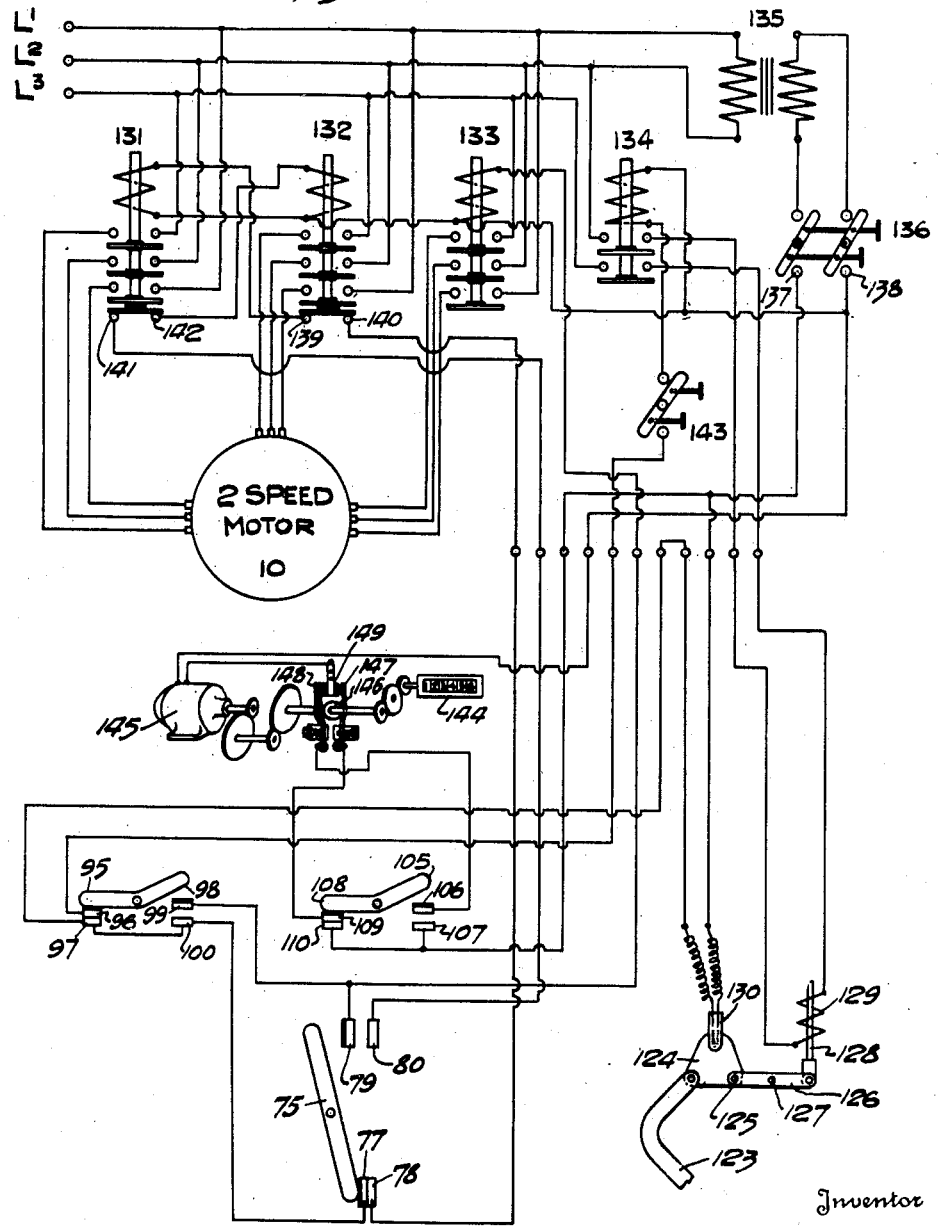
Fig. 11 is an electrical diagram showing the connections between the elements of the automatic controlling means.

An example of electrical circuits for automatically controlling the operation of the weighing machine is shown diagrammatically in Fig. 11. The diagram shown in this figure is suitable for three phase alternating current for operating the motor which drives the feeder, the controls being operated by a single phase alternating current, but it is to be understood that the same electrical system substantially as shown in this diagram may be used for either single phase alternating current or for direct current.

In the diagram, Fig. 11, $L^1$, $L^2$ and $L^3$ represent the three lines from a suitable source of three phase alternating current, 131 represents an electromagnetic relay three pairs of contacts of which, when this relay is energized, connect the power lines $L^1$, $L^2$ and $L^3$ to the high speed winding of the motor 10 which is of a two speed type, 132 represents an electromagnetic relay three pairs of contacts of which connect, when this relay is energized, the line wires $L^1$, $L^2$ and $L^3$ to the low speed winding of the motor 10, and 133 represents an electromagnetic relay three pairs of contacts of which, when this relay is energized, connect the line wires L¹, L² and L³ to a brake incorporated in the motor 10, this brake when energized, being inoperative or permitting the motor to run freely and when deenergized serving to stop the running of the motor. 134 represents an electromagnetic relay for releasing the weigh hopper discharge door 120, it having two pairs of contacts which, when this relay is energized, connect the line wires L² and L³ to the solenoid 129 which breaks the toggle 123, 124 and releases the weigh hopper discharge door.

Single phase alternating current derived from the line wires L¹ and L² energizes the primary of a step-down transformer 135 the secondary of which is controlled by a switch 136 having terminals 137 and 138. A circuit leads from the terminal 137 through the weigh hopper discharge door switch 130, thence to contact 97 of switch 95 to contact 100 of switch 98, thence to contact 77 of switch operating member 75, thence from contact 78, through contacts 139 and 140 of relay 132, thence through the winding of relay 131 and then to the terminal 138 of switch 136. Another circuit leads from contact 99 of switch 98 to contact 79 of switch operating member 75, thence from contact 80 of the latter switch through contacts 141 and 142 of relay 131 and through the winding of relay 132 and then to the terminal 138 of switch 136. A branch circuit leads from the contact 79 of switch operating member 75 to the winding of the relay 133 and through said winding to the contact 138 of switch 136. Another circuit leads from the hopper door discharge switch 130 to contact 97 of switch 95, then from contact 96 of said switch through a test switch 143 to the winding of relay 134, and through this winding to the terminal 138 of switch 136.

The machine as shown is provided with a counter 144 for totalizing the number of weighings made during the period of operation. For this purpose, a counter is employed which may be of any suitable and known type, the counter shown diagrammatically in the present instance comprising a motor 145 which operates the counter a half revolution, through a reduction gearing, for each energization thereof and during each half revolution of the counter moves a cam 146 driven by the motor alternately into positions to engage and disengage the contacts 147 and 148 with a contact 149 connected to one terminal of the motor 145. The circuit for this counter leads from the contact 137 of switch 136 to contact 110, then to contact 109 of switch 108 and from the latter to contact 147, motor 145 and then to contact 138 of switch 136, or through a branch circuit from contact 137 to contact 107, then to contact 106 of switch 105, then to contact 148, motor 145 and then to contact 138 of switch 136. When the motor circuit is closed through contact 148, the motor is energized and rotates the cam 146 through a half revolution, thereby disengaging this contact from the contact 149 and stopping the motor after the counter has been advanced a half revolution, the contact 147 being then engaged with the contact 149, and when the motor circuit is closed through the contact 147, the cam 146 makes another half revolution thereby disengaging contact 147 from contact 149 and stopping the motor after the counter has advanced the other half revolution.

The operation of an automatic weighing machine constructed as hereinbefore described and shown in the drawings is as follows:

As a preliminary, the machine may be tested to determine whether the beam system is in an accurately balanced condition when the weigh hopper is empty. This is accomplished by setting the poise 49 at the zero mark on its beam, as shown in Fig. 4. If the weigh hopper is empty and both beams 30 and 31 assume balance positions, as shown by the indicators 56 and 60 respectively, the beam system is in true balance with the tare load of the empty weigh hopper, the beams 30 and 31 then balancing, by only the balance pans 46 and 47, respectively, the proportions of the tare load carried by the respective beams, the ratio of these proportions depending on the ratio of the floating load splitting lever or beam 38. During this test, the switch 136 in the circuit containing the automatic control devices is open so that the motor 10 driving the feeder is idle, and the other switches at this time are as shown in Fig. 11.

By moving the poise 49 along the beam 31 to the mark representing the weight of the loads to be weighed, as for example, the 100 lb. mark, as shown in Fig. 7, the weighing mechanism is set in condition to start the weighing cycle. Movement of the poise 49 from the zero mark throws the beam 31 out of balance, it dropping to the lower stop 51. As the weighted end of the beam 31 thus descends, it engages the abutment 89 on the link 88 and thereby tilts the compensating lever 85 and the switches 95, 98, 105 and 108 connected to it. The compensating weight 90 on the lever 85 exerts an upward pull on the beam 31 which lifts its weighted end before the weigh hopper has received its full weighing and to stop the feed of material, thus compensating for the weight of material falling off the discharge end of the feeder 5 into the weigh hopper at the moment the beam 31 rises and the feed is cut off.

The descent of the weighted end of the beam 31 under the action of the poise 49 rocks the compensating lever 85 in a direction to open the switches 95 and 108 and close the switches 98 and 105. Since the tare beam 30 at this time is balanced, the contacts 77 and 78 will be closed and the contacts 79 and 80 of this switch will be open. Assuming the weigh hopper door is closed, the hopper door switch will be closed and the hopper will be ready to receive a weighing. The empty balance indicator 56 at this time will be in its middle or zero position, showing that the tare beam 30 is balanced, and the full balance indicator 60 will be off its scale since the weigh beam 31 is off balance, as shown in Fig. 7. The relays 131, 132, 133 and 134 at this time will all be de-energized.

With the switches in the positions described, and assuming material is supplied through the chute 3 to the feeder 5 and electric current is supplied to the lines L¹, L² and L³, closing of the control switch 136 will start the weighing cycle. Closing of the switch 136 supplies current from its terminal 137, through hopper door switch 130 which is then closed, contacts 97 and 100 of switches 95 and 98, closed contacts 77 and 78, contacts 139 and 140 of relay 132 which is then de-energized, solenoid winding of relay 131 and thence to terminal 138 of switch 136. The circuit thus completed with the secondary of transformer 135 operates the relay 131 to close the line circuit from the power lines L¹, L² and L³, through the three pairs of contacts of this relay, to the high speed winding of the motor 10, and the latter then operates at its higher speed to drive the feeder 5 to feed material into the weigh hopper with a full flow or feed. A branch circuit is completed at the same time from the contact 99 of switch 98 through the solenoid winding of relay 133 and then to terminal 138 of switch 136, thereby closing the three pairs of contacts of this relay and energizing the brake of the motor 10 to hold the brake in inoperative condition. As the material is fed into the weigh hopper, the pull exerted on the hook 36 increases. A portion of this increased load is carried by the tare beam 30 which is thereby thrown out of balance and is tilted until the abutment 72 on the shackle engages the top of the link 69, the beam 30 at this time however being out of engagement with its upper stop 52. The remaining portion of the load is carried by the weigh beam 31 which, however, cannot rise to a balanced position until the additional pull on the hook is sufficient to counterbalance the poise 49. This stage of the weighing cycle, with the weigh hopper partially filled, is shown in Fig. 8.

As the load in the weigh hopper increases under the full flow of material therein, the load transmitted by lever 38 through abutment 72 to link 69 increases, and this force tends to lift the weighted end of lever 65 and thereby operate the switch operating member 75. The weight 73 however holds lever 65 down on its stop until the load of material fed into the weigh hopper reaches the proportion of the full weighing for which the weight 73 is set as, for example, 80 per cent of a full weighing. When such proportion of the full weighing has been fed into the weigh hopper, the force exerted by the abutment 72 on the link 69 is sufficient to lift the weighted end of the lever 65, thereby operating the switch operating member 75 to open the full feed controlling contacts 77 and 78 and to close the dribble feed controlling contacts 79 and 80. The tare beam 30 then comes to rest against its upper stop 52, as shown in Fig. 9.

Opening of the contacts 77 and 78 breaks the circuit through the solenoid winding of relay 131, thereby deenergizing it and causing its contactor to open the power circuit to the full or higher speed winding of the motor 10 and to close the contacts 141 and 142 of this relay, and closing the contacts 79 and 80 of switch 75 completes a circuit from terminal 137 of switch 136, through the then closed hopper door switch 130, contact 97 of switch 95, engaged contacts 99 and 100 of switch 98, engaged contacts 79 and 80, engaged contacts 141 and 142 of de-energized relay 131, solenoid winding of relay 132 and then to terminal 138 of switch 136. Completion of this circuit operates the relay 132 to close the power circuit from the power lines $L^1$, $L^2$ and $L^3$ to the lower speed winding of the motor 10, through the three pairs of contacts of this relay which were disengaged when this relay was de-energized. A branch circuit is completed at the same time from the contact 99 of switch 98 through the solenoid winding of relay 133 and then to terminal 138 of switch 136, thereby closing the three pairs of contacts of this relay and energizing the brake of the motor 10 to hold the brake in inoperative condition. The motor 10 then operates the feeder 5 at its slower or dribble speed, and the remaining proportion of the full weighing, as 20 per cent in the example above stated, flows into the weigh hopper at such slower rate, this stage in the weighing cycle being shown in Fig. 9.

As the weight of material fed into the weigh hopper approaches the amount for which the poise 49 is set, a point is reached where the pull from the lever 38 plus the lift from the link 88 attached to the compensating lever 85 is sufficient to raise the counterweighted end of the weigh beam 31 and drop the compensating lever 85 to its stop 115. Such tilting of the compensating lever also tilts the switches connected thereto, opening the contacts 99 and 100 of the dribble cut off switch 98 and closing the contacts 96 and 97 of the discharge controlling switch 95, and closing the contacts 109 and 110 of counter operating switch 108 and opening the contacts 106 and 107 of counter operating switch 108. Opening of the dribble switch 98 breaks the circuit through the winding of relay 132, thereby de-energizing this relay and breaking the low speed power circuit from the power lines to motor 10, thus stopping the feeder, and opening of the switch 98 also breaks the branch circuit through the solenoid winding of relay 133, thus de-energizing this relay and breaking the line circuit therethrough to the brake of the motor, causing the brake to be applied to stop the motor and feeder 5. The material falling from the feeder to the weigh hopper 6 at the instant the feed is stopped is sufficient to bring the weigh beam 31 to a balance, and this balanced condition will be shown by the full balance indicator 60, as illustrated in Fig. 10.

Closing of the discharge controlling switch 95 completes a circuit from the terminal 137 of switch 136 through the then closed hopper discharge door switch 130, closed contacts 96 and 97 of switch 95 through test switch 143, solenoid winding of relay 134 and then to terminal 138 of switch 136, and if the test switch is closed, as is usual during the continuous operation of the machine, the relay 134 will be energized, closing through its contacts a power circuit from the power lines $L^2$ and $L^3$ through the solenoid 125, causing the latter to break the toggle 123, 124 and thereby unlock the weigh hopper discharge door 120 to automatically discharge the weighed load of material from the weigh hopper. However, if it is desired to test the weighing for accuracy, the test switch 143 may be left open at the beginning of the weighing so that the load of material weighed into the weigh hopper will not be automatically discharged therefrom but will remain therein so that the accuracy of the balance may be indicated. Closing of the test switch will cause the weighed load of material to be discharged from the weigh hopper in the manner already described.

Opening of the discharge door 120 of the weigh hopper opens the hopper discharge door switch 130, and this switch remains open as long as the hopper discharge door is not locked shut. Since this switch 130 is in series in the circuits controlled by the switch operating member 75, and switches 95 and 98 which govern the operation of the feeder operating motor 10, no material can be fed into the weigh hopper by the feeder unless the weigh hopper discharge door is closed and locked. Closing and locking of the weigh hopper discharge door after discharging a weighed load, however, closes the switch 130, permitting the machine to repeat its operating cycle automatically.

Discharge of each weighed load of material from the weigh hopper restores the beams 30 and 31 and the switches governed thereby to the condition shown in Fig. 7, ready for the commencement automatically of another weighing cycle.

Since the tare beam 30 comes to balance when the weighed load is discharged from the weigh hopper, its indicator will show the tare balance condition at the empty or discharge point of each complete cycle of operations.

The dropping of the compensating lever 65 upon its stop 115 when the weighing beam 31 comes to balance during each cycle of operations closes the counter switch 108, thereby completing a circuit from the terminal 137 of switch 136 through the closed contacts 109 and 110, terminals 147 and 149 and motor 145 to terminal 138 of switch 136, thereby causing motor 145 to operate the counter through a half revolution and rotate the cam 146 to disengage the contact 147 from the contact 149 and engage contact 148 therewith, and upon discharge of the weighed load of material from the weigh hopper, the counter switch 108 is opened and the counter switch 105 is closed, thereby completing a circuit from terminal 137 through the closed contacts 106 and 107, contact 148 and motor 145 to terminal 138, thereby again energizing motor 145 to operate the counter through its remaining half revolution to make a count of the weighed and discharged load and rotating the cam 146 to break the motor circuit by disengaging the switch member 148 from the contact 149 and re-engaging the contact 147 with contact 149 ready for the next count.

An automatic weighing machine constructed as hereinbefore described provides a tare beam which is separate and distinct from the beam which performs the actual weighing and which may come to balance position and its balanced condition indicated after the discharge of each weighed load of material is discharged from the weigh hopper, and it provides a gross weighing beam which is separate and distinct from the tare beam and which may come to balance and its balanced condition indicated when the full load of material has been fed into the weigh hopper, but which does not move until the full weighing is made and a balanced condition obtains.

The balancing of the tare load beam after the discharge of each weighed load of material from the weigh hopper is not influenced by the control switches governed by this beam so that the tare beam is free to balance, and the gross weighing beam is not influenced by the control switches governed by this beam since these control switches are operated by the compensating lever which comes to its stop before the gross weighing beam comes to a balance, thus leaving this beam free to assume a position which corresponds accurately with the weight of the load of material fed into the weigh hopper. Accuracy in the weighings is therefore ensued, and any adjustments that may be necessary will be indicated by the indicators for the beams during the cycles of weighing operations.

I claim as my invention:

1. In an automatic weighing machine having a weigh hopper and means for feeding material to and discharging it from the weigh hopper, a tare beam and a gross weighing beam, a floating lever connected at its ends to the respective beams and connected between its ends to the weigh hopper for proportionately dividing between said beams the load of the weigh hopper, said beams being separately pivoted and independently operable, an indicator connected to and operable by each of said beams for indicating the balance position thereof, and means having lost motion connections with and governed by said beams for automatically controlling the feeding of material to and the discharging thereof from the weigh hopper, said beams being free of the influence of said latter means while in balance positions.

2. In an automatic weighing machine having a weigh hopper and means for feeding material to and discharging it from the weigh hopper, a tare beam and a gross weighing beam, a floating lever connected at its ends to the respective beams and connected between its ends to the weigh hopper for proportionately dividing between said beams the load of the weigh hopper, said beams being separately pivoted and independently operable, an indicator connected to and operable by each of said beams for indicating the balance position thereof, a stop for limiting the movement of the tare beam in either direction from a balance position under the influence of material fed into the weigh hopper, and means having lost motion connections with and governed by said beams for automatically controlling the feeding of material to and the discharging thereof from the weigh hopper, said beams while in balance positions being free of the influence of said controlling means.

3. In an automatic weighing machine having a weigh hopper and means for feeding material to and discharging it from the weigh hopper, a tare beam and a gross weighing beam, a floating lever connected at its ends to the respective beams and connected between its ends to the weigh hopper for proportionately dividing between said beams the load of the weigh hopper, said beams being separately pivoted and independently operable, an indicator connected to and operable by each of said beams for indicating the balance position thereof, means having a lost motion connection with and governed by the tare beam for feeding material to the weigh hopper, and means having a lost motion connection with and governed by the gross weighing beam independently of the tare beam for controlling the discharge of material from the weigh hopper.

4. In an automatic weighing machine having a weigh hopper and means for feeding material to and discharging it from the weigh hopper, a tare beam and a gross weighing beam having means for proportionately dividing between them the load of the weigh hopper, said beams being separately pivoted and independently operable, an indicator connected to and operable by each of said beams for indicating the balance position thereof, means governed by the tare beam for feeding material to the weigh hopper first with a full feed and then with a dribble feed, and means governed by the gross weighing beam independently of the tare beam for cutting off the dribble feed and discharging the weighed material from the weigh hopper.

5. In an automatic weighing machine having a weigh hopper and means for feeding material to and discharging it from the weigh hopper, a tare beam and gross weighing beam, a floating lever connected at its ends to the respective beams and connected between its ends to the weigh hopper for proportionately dividing between said beams the load of the weigh hopper, said beams being separately pivoted and independently operable, an indicator connected to and operable by each of said beams for indicating the balance position thereof, means including a switch having a lost motion connection with the tare beam and operable while the tare beam is in a tare balance position and free of the influence thereof for feeding material to the weigh hopper, and means including a switch having a lost motion connection with the gross weighing beam and operable when the gross weighing beam assumes a balance position and becomes free of the influence thereof for cutting off the feed of material to the weigh hopper.

6. In an automatic weighing machine having a weigh hopper and means for feeding material to and discharging it from the weigh hopper, a tare beam and a gross weighing beam having means for proportionately dividing between them the load of the weigh hopper, said beams being separately pivoted and independently operable, an indicator connected to and operable by each of said beams, means including a switch operable while the tare beam is in a tare balance position and free of the influence thereof for feeding material to the weigh hopper with a full feed and for reducing the feed of material to a dribble feed by movement of the tare beam out of tare balance position when a predetermined proportion of the material to be weighed has been fed into the weigh hopper, and means including a switch governed by the gross weighing beam as it approaches balance position for cutting off the dribble feed, the gross weighing beam being free of the influence of said dribble feed cutting off means while it is in balance position.

7. In an automatic weighing machine having a weigh hopper and means for feeding material to and discharging it from the weigh hopper, a tare beam and a gross weighing beam having means for proportionately dividing between them the load of the weigh hopper, said beams being separately pivoted and independently operable, an indicator connected to and operable by each of said beams for indicating the balance position thereof, means including a switch operable while the tare beam is in a tare balance position and free of the influence thereof for feeding material to the weigh hopper with a full feed and for reducing the feed of material to a dribble feed by movement of the tare beam out of tare balance position when a predetermined proportion of the material to be weighed has been fed into the weigh hopper, means including a switch governed by the gross weighing beam as it approaches balance position for cutting off the dribble feed, and means including a switch governed by the gross weighing beam as it approaches balance position for discharging the material from the weigh hopper, the gross weighing beam while in balance position being free of the influence of said means for cutting off the dribble feed and said discharging means.

8. In an automatic weighing machine having a weigh hopper and means for feeding material to and discharging it from the weigh hopper, a tare beam and a gross weighing beam, a floating lever connected at its ends to the respective beams and connected between its ends to the weigh hopper for proportionately dividing between said beams the load of the weigh hopper, said beams being separately pivoted and independently operable, an indicator connected to and operable by each of said beams, means including a switch having a lost motion connection with the tare beam and operable while the tare beam is in a tare balance position for feeding material to the weigh hopper, and means including a switch and compensating means for the falling column of material, said switch being connected to said compensating means and the latter having a lost motion connection with and being operable upon the gross weighing beam for operating said switch to cut off the feed of material to the weigh hopper, the gross weighing beam being movable beyond the influence of said compensating means into a balance position.

9. In an automatic weighing machine having a weigh hopper and means for feeding material thereto, a pair of separately pivoted distinctly operable beams counterweighted to proportionately support the weigh hopper, means beyond the influence of one of said beams while in balance position for initiating the feeding of material into the weigh hopper and operable by movement of said beam out of balance position under the load of material fed into the weigh hopper for automatically reducing the rate of feed, and means operable under control of movement of the other beam toward balance position under the load of material in the weigh hopper for automatically cutting off said feed, said other beam being free of the influence of said latter means while in balance position.

10. In an automatic weighing machine having a weigh hopper and means for feeding material to and discharging it from said hopper, separately pivoted distinctly operable tare and gross weighing beams, the tare beam being counterweighted to support a proportion of the weight of the weigh hopper and the gross weighing beam being counterbalanced to support the remaining proportion of the weight of the weigh hopper and the net weight of a load of material to be weighed, means beyond the influence of the tare beam while in balance position for initiating the feeding of material into the weigh hopper and operable by movement of the tare beam out of balance position under the load of material fed into the weigh hopper for automatically reducing the rate of feed, and means operable under control of movement of the gross weighing beam toward balance position for automatically cutting off said feed and discharging the load of material from the weigh hopper, the gross weighing beam being free of the influence of said feed cutting off and discharging means while in balance position.

11. In an automatic weighing machine having a weigh hopper and means for feeding material to and discharging it from said hopper, separately pivoted distinctly operable tare and gross weighing beams, the tare beam being counterweighted to support a proportion of the weight of the weigh hopper and the gross weighing beam being counterbalanced to support the remaining proportion of the weight of the weigh hopper and the net weight of a load of material to be weighed, means beyond the influence of the tare beam while in balance position for initiating the feeding of material into the weigh hopper and operable by movement of the tare beam out of balance position under the load of material fed into the weigh hopper for automatically reducing the rate of feed, means to compensate for the weight of material falling into the weigh hopper when the feed is cut off, said compensating means acting on and being controlled by the gross weighing beam as it approaches balance position and said gross weighing beam being free of the influence of said compensating means when it assumes balance position, and means operable by said compensating means to cut off the feed of material to the weigh hopper and to discharge the weighted load of material therefrom.

12. In an automatic weighing machine having a weigh hopper and means including controlling switches for feeding material to and discharging it from the weigh hopper, a pair of separately mounted distinctly operable weigh beams, means for supporting the weigh hopper proportionately from said beams, one of said beams being counterweighted to balance its proportion of the tare weight of the weigh hopper, and the other beam being counterweighted to balance its proportion of the tare weight of the weigh hopper and a proportion of the net weight of the material to be weighed, a weighted member operable as said tare beam assumes a tare balance position to actuate one of said feed controlling switches to initiate feed of material to the weigh hopper and operable as said tare beam moves out of balance position under the influence of a predetermined proportion of the weight of the material to be weighed in the weigh hopper to actuate a second one of said feed controlling switches to reduce the feed of material, and a weighted lever acting on the other beam to compensate for the weight of the material being fed into the weigh hopper after cut off and operable under control of said beam to actuate another of said feed controlling switches to cut off the feed of material to the weigh hopper and to actuate the discharge controlling switch to discharge the weighed material from the weigh hopper.

13. In an automatic weighing machine having a weigh hopper, means including full feed and dribble feed controlling switches for controlling the feed of material to the weigh hopper, and means including a switch for controlling the discharge of the weighed material from the weigh hopper, a tare beam counterweighted to balance the weigh hopper, a gross weighing beam counterweighted to balance the gross load of the weigh hopper and the weighed material therein, a weighted lever operatively connected to the full feed controlling switch to close said switch and initiate the full feed when the tare beam assumes a balanced position and to open said switch and stop the full feed and close the dribble feed switch to initiate the dribble feed when a predetermined proportion of the weight of the material acts on the tare beam, and means governed by the gross weighing beam for operating another of said feed controlling switches to cut off the dribble feed and for operating the discharge controlling switch to discharge the weighed material from the weigh hopper.

14. In an automatic weighing machine having a weigh hopper, means including full feed and dribble feed controlling switches for controlling the feed of material to the weigh hopper, and means including a switch for controlling the discharge of the weighed material from the weigh hopper, a tare beam counterweighted to balance the weigh hopper, a gross weighing beam counterweighted to balance the gross load of the weigh hopper and the weighed material therein, a weighted lever operatively connected to the full feed controlling switch to close said switch and initiate the full feed when the tare beam assumes a balance position and to open said switch and stop the full feed and close the dribble feed switch to initiate the dribble feed when a predetermined proportion of the weight of the material acts on the tare beam, a weighted compensating lever acting on the gross weighing lever to move it toward balance position, and means connecting the compensating lever to another of said feed controlling switches and the discharge controlling switch to cut off the feed of material and discharge the weighed material from the weigh hopper.

15. In an automatic weighing machine having a weigh hopper and means for feeding material to and discharging it from said hopper, a pair of separately mounted and distinctly operable weigh beams having respectively means for balancing the weigh hopper and the weigh hopper and a load to be weighed therein, a floating lever connected at its ends to the respective beams and connected between its ends to the weigh hopper for supporting the weigh hopper proportionately by said beams, means controlled automatically by one of said beams to reduce the rate of feeding of the material to the weigh hopper, means controlled automatically by said one of said beams for indicating an empty balance condition of the weigh hopper, and means governed by the other of said beams for stopping the feeding of material to and discharging it from the weigh hopper.

16. In an automatic weighing machine having a weigh hopper and means for feeding material to and discharging it from said hopper, a pair of separately mounted distinctly operable weigh beams, a floating lever connected at its ends to the respective beams and connected between its ends to the weigh hopper for supporting the weigh hopper proportionately by said beams, means counterbalancing one of said beams to balance a proportion of the tare weight of the weigh hopper, means for counterbalancing the other beam to balance another proportion of the tare weight of the weigh hopper and a proportion of the load to be weighed therein, means controlled automatically by said one of said beams to reduce the rate of feeding of the material to the weigh hopper, means controlled by said one of said beams for automatically indicating an empty balance condition of the weigh hopper, and means having a lost motion connection with said other beam and governed automatically thereby for stopping the feeding of material to and discharging it from the weigh hopper.

17. In an automatic weighing machine having a weigh hopper and means for feeding material to and discharging it from said hopper, the combination of a pair of separately mounted and separately operable weighing beams, a floating lever connected at its ends to the respective beams and connected between its ends to the weigh hopper for supporting the weigh hopper proportionately by said beams, one of said beams being counterbalanced to balance the tare load and the other beam being counterbalanced to balance the gross load, and means having lost motion connections with and governed by said beams for controlling the feeding of material to and the discharging thereof from the weigh hopper, said beams being free to swing independently in a balanced condition within limits set by said material controlling means, and one of said beams oscillating with a tare balance and the other of said beams oscillating with a gross balance.

JOHN P. CLIFFORD.